United States Patent
Bast et al.

(10) Patent No.: US 9,019,173 B2
(45) Date of Patent: Apr. 28, 2015

(54) METHOD FOR GENERATING MANOEUVRE GRAPHICS IN A NAVIGATION DEVICE

(75) Inventors: Tanja Bast, Hetzles (DE); Carlo Voigt, Erlangen (DE)

(73) Assignee: Elektrobit Automotive GmbH, Erlangen (DE)

( * ) Notice: Subject to any disclaimer, the term of this patent is extended or adjusted under 35 U.S.C. 154(b) by 453 days.

(21) Appl. No.: 13/141,830

(22) PCT Filed: Dec. 23, 2008

(86) PCT No.: PCT/EP2008/011063
§ 371 (c)(1),
(2), (4) Date: Aug. 11, 2011

(87) PCT Pub. No.: WO2010/072236
PCT Pub. Date: Jul. 1, 2010

(65) Prior Publication Data
US 2011/0285717 A1    Nov. 24, 2011

(51) Int. Cl.
G09G 5/00 (2006.01)
G06T 11/20 (2006.01)
G01C 21/36 (2006.01)

(52) U.S. Cl.
CPC ........ G01C 21/3635 (2013.01); G01C 21/3658 (2013.01)

(58) Field of Classification Search
CPC ........ G01C 21/00; G01C 23/00; G01C 21/36; G01C 21/3635; G06F 3/0488; G06F 17/30864
USPC ....................................................... 345/441
See application file for complete search history.

(56) References Cited

U.S. PATENT DOCUMENTS

| 4,937,570 A | 6/1990 | Matsukawa et al. |
| 5,402,120 A | 3/1995 | Fujii et al. |

(Continued)

FOREIGN PATENT DOCUMENTS

| DE | 10105900 A1 | 8/2002 |
| EP | 0534533 A1 | 3/1993 |

(Continued)

OTHER PUBLICATIONS

International Search Report of PCT/EP2008/011063, mailing date Sep. 21, 2009.

(Continued)

*Primary Examiner* — Jason M Repko
*Assistant Examiner* — F. M. Hossain
(74) *Attorney, Agent, or Firm* — Westerman, Hattori, Daniels & Adrian, LLP

(57) ABSTRACT

A technique for controlling a navigation device to generate a navigation maneuver graphics for a road junction maneuver is proposed. A device embodiment of this technique comprises a routing module adapted to provide routing information pertaining to a scheduled route, with the scheduled route comprising the road junction. Furthermore, an interface to a map database is provided, with the map database containing road data pertaining to the upcoming road junction. A processor of the navigation device analyzes the road data to determine one or more junction geometry parameters of the road junction and to compose, based on the junction geometry parameters and from a plurality of pre-defined graphical junction elements, junction graphics data representative of the road junction. The processor is further adapted to generate, from the routing information and the junction geometry parameters, maneuver indication graphics data representative of the junction maneuver. A display module may then render navigation maneuver graphics based on the junction graphics data and the maneuver indication graphics data.

13 Claims, 7 Drawing Sheets

(56) References Cited

U.S. PATENT DOCUMENTS

| | | | |
|---|---|---|---|
| 7,502,685 B2* | 3/2009 | Nakamura | 701/437 |
| 2002/0070934 A1 | 6/2002 | Sakamoto et al. | |
| 2004/0093153 A1 | 5/2004 | Buth et al. | |
| 2008/0208450 A1* | 8/2008 | Katzer | 701/201 |
| 2008/0215235 A1* | 9/2008 | Strassenburg-Kleciak et al. | 701/200 |
| 2011/0112756 A1* | 5/2011 | Winkler et al. | 701/201 |

FOREIGN PATENT DOCUMENTS

| | | | |
|---|---|---|---|
| EP | 1681538 A1 * | 7/2006 | G01C 21/34 |
| EP | 1881294 A1 | 1/2008 | |
| GB | 2444415 A | 6/2008 | |
| JP | 2008-151752 A | 7/2008 | |

OTHER PUBLICATIONS

Written Opinion of PCT/EP2008/011063, mailing date Sep. 21, 2009.

Written Opinion of PCT/EP2008/011063, mailing date Feb. 23, 2011.

International Preliminary Report on Patentability of PCT/EP2008/011063, mailing date Apr. 5, 2011.

* cited by examiner

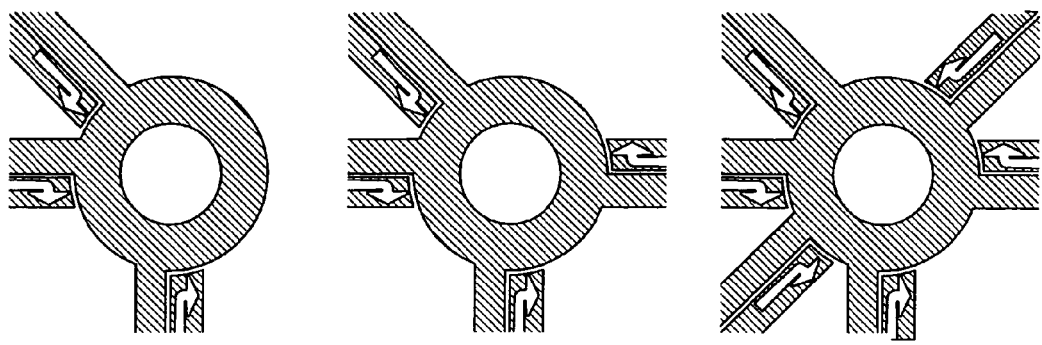
Fig. 4A
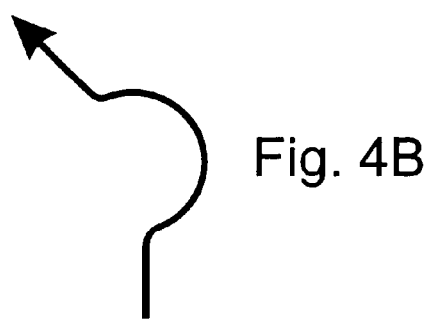
Fig. 4B
Fig. 4C
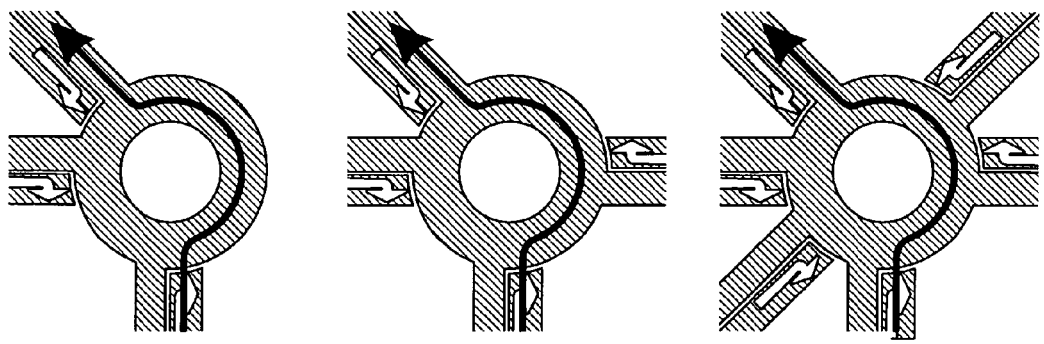

METHOD FOR GENERATING MANOEUVRE GRAPHICS IN A NAVIGATION DEVICE

TECHNICAL FIELD

The present disclosure generally relates to navigation technology. In particular, the disclosure concerns a technique for generating by a navigation device a navigation manoeuvre graphics for a road junction.

BACKGROUND

Modern navigation devices as used, for example, in road vehicles greatly facilitate the finding of the right route to a certain destination or point of interest. Additionally, navigation devices increase driving safety by disburdening the driver from both mental and physical acts while driving, such as from handling and analysing a conventional map.

One important feature of most navigation devices is the graphical display of manoeuvre instructions. The driver resorts to the graphical manoeuvre instructions whenever voice guidance has not been understood or the manoeuvre is too complex to be grasped from mere voice guidance. Complex driving manoeuvres are typically encountered in bigger cities with confusing road junctions and broad roads having many road lanes.

To efficiently assist the driver during junction manoeuvres, current navigation devices display a direct visual rendering of map data for a road portion including the junction (sometimes together with a line or arrow indicative of the required junction manoeuvre). Instead of simply showing a direct visual rendering of the map data, some more sophisticated navigation devices are capable of displaying a pre-rendered image of the actual junction geometry. A manoeuvre graphics visualizing an image of the actual junction geometry is of course more instructive than the mere rendering of the corresponding map data. It has empirically been found that despite this advantage, current navigation devices display the actual junction geometry only for motor-way exits, but not for other junction types that would benefit from enhanced manoeuvre graphics, such as roundabouts. This fact is attributed to the comparatively high memory requirements of re-rendered images. As is well known, memory is still a limited resource in particular in mobile navigation devices.

SUMMARY

There is a need for a memory efficient technique for controlling a navigation device to generate a navigation manoeuvre graphics.

According to a first aspect, a method of controlling a navigation device to generate a navigation manoeuvre graphics for a road junction manoeuvre is provided. The method comprises the following steps performed by the navigation device: receiving, from a routing module of the navigation device, routing information pertaining to a scheduled route, the scheduled route comprising a road junction; retrieving, from a map database, road data pertaining to the road junction; analyzing the road data determine one or more junction geometry parameters of the road junction; composing, based on the junction geometry parameters and from a plurality of pre-defined graphical junction elements, junction graphics data representative of the road junction; generating, from the routing information and the junction geometry parameters, manoeuvre indication graphics data indicative of the junction manoeuvre; and generating a navigation manoeuvre graphics based on the junction graphics data and the manoeuvre indication graphics data. The generated navigation manoeuvre graphics may then be output by a display module of the navigation device.

Instead of storing a pre-rendered image for each possible junction configuration, the junction graphics data (e.g., image data) may be composed and rendered by the navigation device at runtime. For example, the junction graphics data may be composed after the navigation device has calculated a scheduled route or during this calculation process. Since the graphical junction elements can be repeatedly re-used in the form of a kit to compose the junction graphics data for different actual road junctions, the memory requirements are drastically reduced compared to the provision of pre-rendered junction images.

The road junction for which the navigation manoeuvre graphics is generated may be an upcoming road junction during the ongoing navigation process. This includes the case in which the navigation manoeuvre graphics is generated in a preview mode for the second, third, or further road junction to come. Moreover, the navigation manoeuvre graphics may also be generated for route planning purposes with no ongoing navigation process.

The number of pre-rendered images that would need to be stored is particularly high in case the rendered junction image should also be illustrative of the specific lane configuration of a specific junction. For this reason, the road data retrieved from the map database or another information source may comprise lane information for the road junction. In case lane information becomes available, the determination of the junction geometry parameters may take into account this lane information, so that the composed junction graphics data may also be representative of (e.g., may be adapted to visualize) the lane information.

The graphical junction elements may be stored in a storage module accessible by the navigation device. The graphical junction elements may comprise at least one of a roundabout element, a road background element, one or more lane boundary marking elements, and one or more lane arrow elements indicative of a junction egress lane or road each. The graphical junction elements may be provided in various graphics formats. According to one implementation, the graphical junction elements are at least partially provided in a vector graphics format. The vector graphics format may be scalable. According to another implementation, the graphical junction elements are at least partially provided in a bitmap graphics format.

The junction geometry parameters derived from the road data may comprise at least one of a junction type (indicative, e.g., of whether the junction has a star-like configuration or the configuration of a roundabout), a number of roads crossing at the junction, an angle which a specific road enters the junction, and lane information. The lane information may comprise at least one of a number of lanes comprised by a specific road of the junction, a lane type for a lane comprised by a road, and an egress lane or road associated with a lane.

The manoeuvre indication as represented by the visualized manoeuvre indication graphics data may be indicative of at least one of a junction ingress (e.g., a junction ingress road or lane) and a junction egress (e.g., a junction egress road or lane). In one variant, the manoeuvre indication takes the form of a line or an arrow. The graphical manoeuvre indication may be combined with (e.g., superimposed on) the representation of the road junction as defined by the junction graphics data.

The method may further comprise the step of determining graphics settings and processing at least one of the junction graphics data and the manoeuvre indication graphics data taking into account the graphics settings. The graphics settings may include at least one of country-specific graphics settings (e.g., regarding the colour of road or lane markings) and user-specific graphics settings (e.g., concerning a preferred colour scheme or background). The method may also comprise the step of determining image settings, so that at least one of the junction graphics data and the manoeuvre indication graphics data can be processed taking into account the image settings. The image settings may include at least one of an image size and an image tilt angle (e.g., a view from above, a bird eye's view, a driver's view, etc.).

According to a further aspect, a computer program product comprising program code portions for performing the steps of the technique presented herein when the computer program product is run on a navigation device is provided. The computer program product may be stored on a computer-readable recording medium such as a memory chip, a CD-ROM, a memory card, a harddisk, and so on. Moreover, the computer program product may be provided for download via a network, such as the Internet.

According to a further aspect, a navigation device adapted to generate a navigation manoeuvre graphics for a road junction manoeuvre is provided. The navigation device comprises a routing module adapted to provide routing information pertaining to a scheduled route, the scheduled route comprising a road junction; an interface to a map database containing road data pertaining to the road junction; and a processor adapted to analyse the road data to determine one or more junction geometry parameters of the road junction, to compose, based on the junction geometry parameters and from a plurality of pre-defined graphical junction elements, junction graphics data representative of the road junction, to generate, from the routing information and the junction geometry parameters, manoeuvre indication graphics data indicative of the junction manoeuvre, and to generate a navigation manoeuvre graphics based on the junction graphics data and the manoeuvre indication graphics data.

The individual modules described may be hardware components. Alternatively, the modules may be software components stored on a computer-readable recording medium and configured to be executed by the processor. Also, the modules may be combinations of hardware and software.

In one implementation, the navigation device further comprises at least one of a display module for outputting the navigation manoeuvre graphics, a navigation sensor module for determining the current location of the navigation device, and the map database. Still further, the navigation device may comprise at least one of a graphics settings storage and an image settings storage. The graphics settings storage may include at least one of country-specific graphics settings and user specific graphics settings, and the processor may be adapted to process at least one of the junction graphics data and the manoeuvre indication graphics data taking into account the graphics settings. The image settings may include at least one of an image size and image tilt angle, and the processor may be adapted to process at least one of the junction graphics data and the manoeuvre indication graphics data taking into account the image settings.

BRIEF DESCRIPTION OF THE DRAWINGS

Further aspects and advantages of the techniques presented herein will become apparent from the following description of preferred embodiments and the drawings, wherein:

FIGS. 4A to 4C schematically illustrate embodiments of generating navigation manoeuvre graphics without taking into account lane information;

DETAILED DESCRIPTION

In the following description of preferred embodiments, for purposes of explanation and not limitation, specific details are set forth in order to provide a thorough understanding of the techniques presented herein. It will be apparent to one skilled in the art that these techniques may be practised in other embodiments that depart from the specific details discussed herein.

Moreover, those skilled in the art will appreciate the functions and steps explained herein may be implemented using software functioning in conjunction with a programmed microprocessor, an Application Specific Integrated Circuit (ASIC), a Digital Signal Processor (DSP), a Field Programmable Gate Array (FPGA) or a general purpose computer. It will also be appreciated that while the following embodiments will primarily be described in context with methods and devices, the techniques presented herein may also be embodied in a computer program product as well as in a system comprising a computer processor and a memory coupled to the processor, wherein the memory is encoded with one or more programs that may perform the functions and steps disclosed herein.

Figure 1:
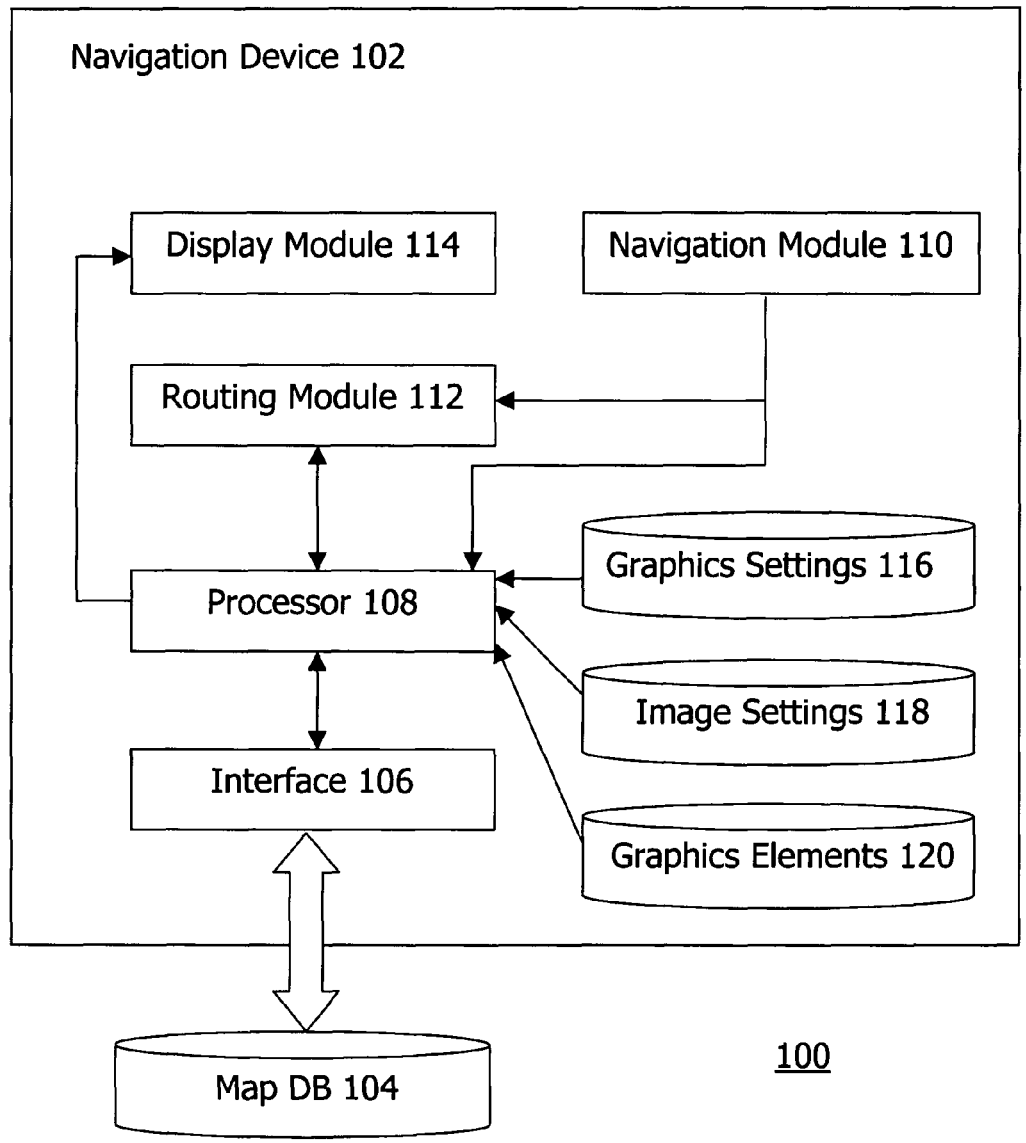
FIG. 1 shows an embodiment of an exemplary navigation device.

FIG. 1 shows an exemplary navigation system 100 comprising a navigation device 102 and a map database 104 with map data and in particular road data (e.g., data in the form of coordinates defining the geographical course of roads). The map database 104 is accessible by the navigation device 102 via an interface 106 and contains data as commonly processed by navigation devices and as commercially available from a plurality of vendors. For this reason, a more detailed discussion of the structure and format of the map data is omitted here.

The database 104 may be an internal database of the navigation device 102 or an external database connected to the interface 106 of the navigation device 102 via connectors, a cable or a wireless or wired network connection. In one implementation, the navigation device 100 is a car navigation device with an external map database 104 provided on a storage card removably insertable into the navigation device 102. In such an implementation, the navigation device 102 may either be a detachable mobile unit or a build-in unit fixedly installed in the car. In another implementation, the navigation device 102 is a mobile telephone. In such an implementation, the map database 104 may be installed on the network side to be accessible via a wireless network connection over the interface 106. The interface 106 may, for example, be realized in the form of a Global System for Mobile communications (GSM) interface or as a Universal Mobile Telecommunications System (UMTS) radio access technology interface.

As shown in FIG. 1, the navigation device 102 comprises a processor 108 configured to perform processing operations under control of software code (i.e., a software program). The software code is installed on a computer-readable medium such as a permanent or re-writeable memory (not shown in FIG. 1) accessible by the processor 108. The processor 108 has access to the map database 104 via the interface 106.

The navigation device 102 further comprises a navigation module 110, a routing module 112 as well as a display module 114 which are each connected to the processor 108. The navigation module 110 is configured to determine the current location of the navigation device and comprises one or more navigation sensors (not shown in FIG. 1) together with an associated software program for processing the output data of the navigation sensors. The navigation sensors may be configured as satellite sensors operable in accordance with the Global Positioning System (GPS) or Galileo standard. As shown in FIG. 1, the navigation module 110 is operatively connected to the processor 108 and the routing module 112 to provide position data (e.g., in the form of global coordinates) to these components.

The routing module 112 is adapted to provide routing information pertaining to a scheduled route to the processor 108. The scheduled route may be calculated by the processor 108 under control of the routing module 112 based, inter alia, on a geographic destination or a geographic point of interest input or selected by a user of the navigation device 102, the current position of the navigation device 102 as determined by the navigation module 110 (or, in particular in a route planning or offline mode, a start position input by a user), and the road data in the map database 104. To this end, the routing module 102 also has access to the map database 104 via the processor 108 and the interface 106. Since the operation of the routing module 112 with respect to determining data indicative of a scheduled route is as such known in the art, it will not be described in more detail here.

The display module 114 is configured to render and display a navigation manoeuvre graphics generated by the processor 108. The display module 114 may take the form of a touch screen or of a conventional mobile telephone display.

As shown in FIG. 1, the navigation device 102 further comprises three storage modules 116, 118, 120 that may each be configured in the form of a data file or a database. Specifically, the navigation device 102 comprises a graphics settings storage module 116, an image settings storage module 118 as well as a graphics elements storage module 120.

The graphics settings storage module 116 is indicative of country-specific graphics settings and user specific graphics settings that will be taken into account by the processor 108 upon generating the navigation manoeuvre graphics. The country-specific graphics settings are, for example, indicative for a plurality of countries of the colours and shapes of road, lane and junction markings (e.g., dashed or solid lane separation lines, white or yellow road markings, white or yellow road or lane arrows, arrow sizes, etc.). User-specific graphics settings relate, for example, to a specific country selection (so that the appropriate country-specific graphics settings can be applied), to a selected colour scheme, to a selected background, and so on.

The image settings storage module 118 stores image settings including an image size setting (that may, for example, be configured in accordance with the size or screen solution of the display module 114). Additionally, the image settings may be indicative of a selected tilt angle of the image. Possible image tilt angles include a view from above, a bird eye's view, and a three-dimensional driver's view. The image tilt angle may be selected by a user or may automatically be selected by the navigation device 102 in accordance with a predefined display strategy.

The graphics elements storage module 120 stores a plurality of pre-defined graphical elements (including junction elements and road elements) required, inter alia, for generating junction graphics data by the processor 108. In the present embodiment, the graphical elements are stored as vector objects in a vector graphics format, for example in accordance with the Scalable Vector Graphics (SVG) standard. The SVG standard specifies an Extensible Mark-Up Language (XML) format (i.e., a text-based format) for describing two-dimensional vector graphics. According to the SVG specifications, any graphics is described by vector shapes such as circles or rectangles. For this reason, an SVG graphics is scalable without any losses.

An important concept of SVG is the re-usability of graphical elements based on the <use> paradigm. If, for example, a certain graphical element is required multiple times upon composing specific junction graphics data, this graphical element has not to be generated anew each time during the composition process.

Figure 2A:
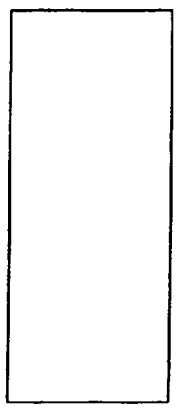
FIGS. 2A to 2E schematically illustrates exemplary graphical junction elements that may be used to compose junction graphics data.
Figure 2B:
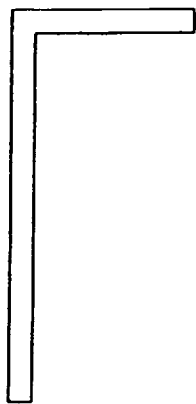
Figure 2C:
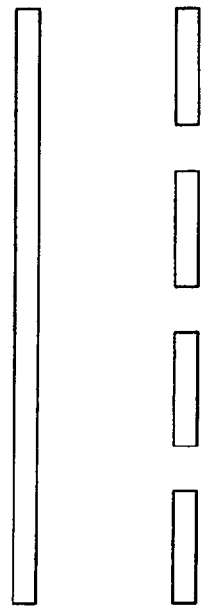
Figure 2D:
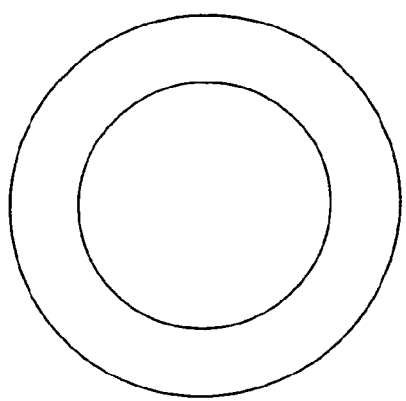
Figure 2E:
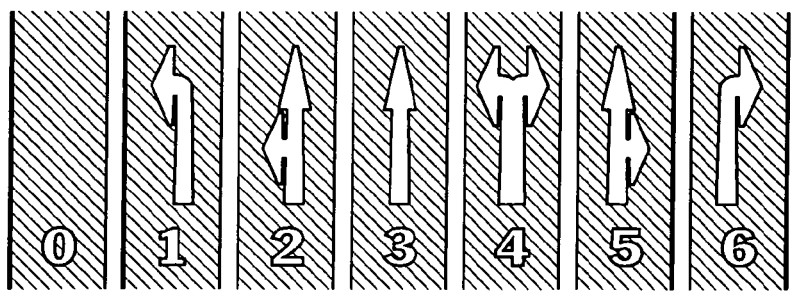

The storage module 120 comprises only a few graphical elements that form a kit that allows to compose a graphics of virtually every desired road junction at minimum storage requirements as will now be described in more detail with reference to FIGS. 2A to 2E. Specifically, FIG. 2A shows a rectangle which is used as a road background element. FIG. 2B illustrates a lane boundary marking element that can be used in combination with the road background element of FIG. 2A to compose a road comprising one or multiple lanes. FIG. 2C illustrates two types of road or lane marking elements in the form of a straight line and a dashed line. A roundabout element is shown in FIG. 2D. The roundabout element of FIG. 2D can be used with two or more of the road background elements of FIG. 2A (at different angular orientations) to compose a roundabout. FIG. 2E illustrates various lane types with the associated lane arrow elements. The lane arrows are each indicative of a junction egress lane or road. Specifically, from the left-hand side to the right-hand side, FIG. 2E illustrates an opposite-lane element, an arrow element for a left-turn lane, an arrow element for a left-turn and straight lane, an arrow element for a straight lane, an arrow element for a left-right-turn lane, an arrow element for a right-turn and straight lane as well as an arrow element for a right-turn lane.

Figure 3:
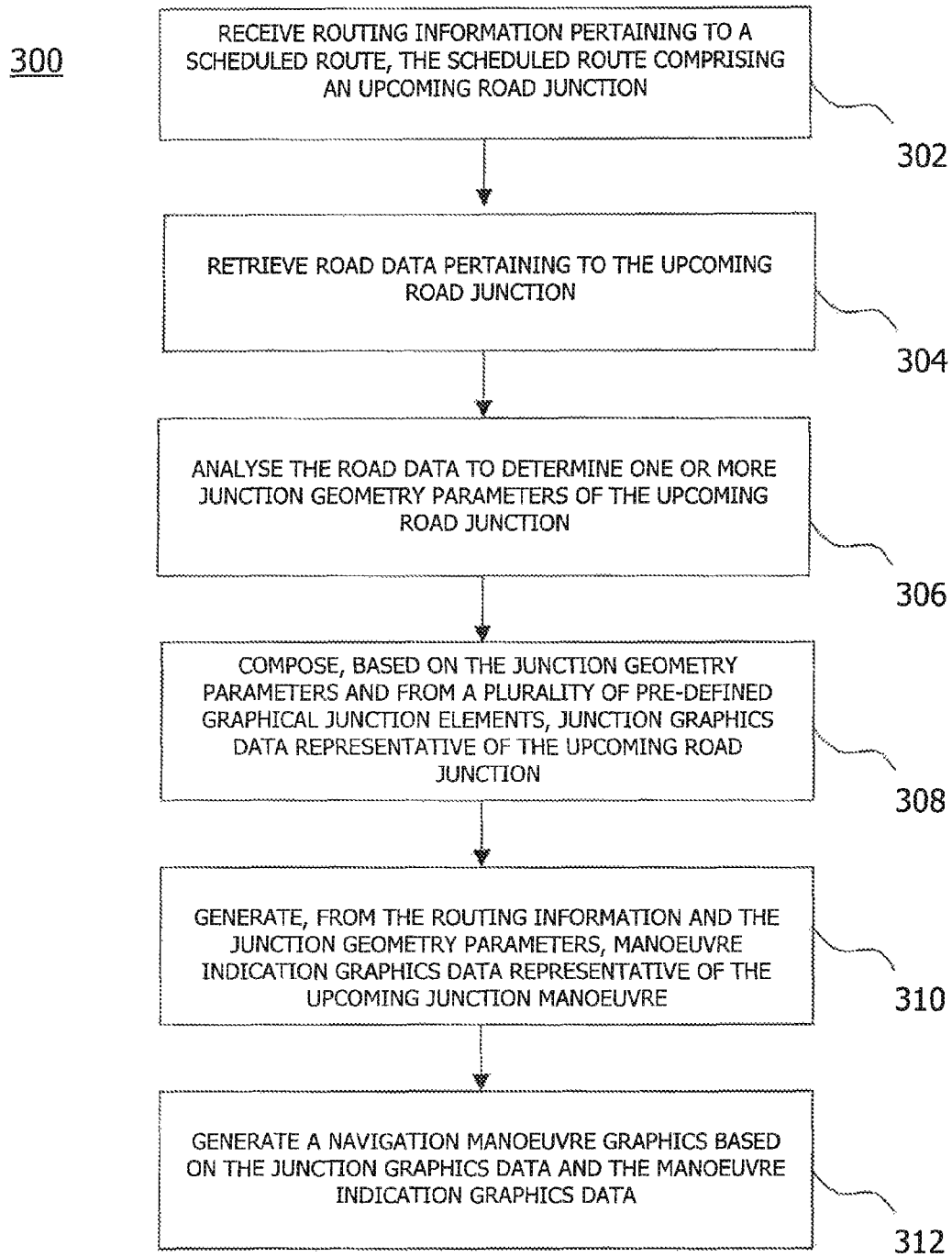
FIG. 3 schematically shows a flow diagram according to a method embodiment.

The operation of the navigation system 100 as shown in FIG. 1 will now be described with reference to the schematic flow diagram 300 of FIG. 3 and with reference to FIGS. 4A to 4C illustrating the generation of an exemplary navigation manoeuvre graphics for a roundabout.

The operation of the navigation device 102 starts in step 302 with the processor 108 receiving routing information pertaining to a scheduled route from the routing module 112. The routing information has been generated based on the current position of the navigation device 102 as determined by the navigation module 110 (or, alternatively, based on a start position selected by a user), a geographic destination or point of interest as input by a user, and the road data stored in the map database 104. In the present example it will be assumed that the scheduled route comprises a road junction in the form of a roundabout with three, four, or five ingress/egress roads.

In a next step 304, the processor 108 retrieves from the map database 104 road data pertaining to the road junction. The road data retrieved in step 304 pertains to a road junction and is indicative of the junction type (i.e., of a roundabout in the present example), of the number of roads forming the junction and of the relative or absolute angles between the involved roads or with respect to a 0° reference. Optionally (but not in the present example), the retrieved road data may also be indicative of lane information, such as the number of lanes comprised by each of the roads, the lane type (see FIG. 2E) for each lane comprised by a road, and an egress lane or road associated with each lane (see also FIG. 2E).

After the road data have been retrieved in step 304, the processor 108 proceeds in step 306 with analyzing the retrieved road data to determine one or more junction geometry parameters of the road junction from the retrieved road data. As mentioned above, the junction geometry parameters thus determined may comprise the junction type, the number of roads crossing at the junction and an angle at which each road enters the junction.

In a next step 308, the processor 108 composes junction graphics data based on the junction geometry parameters determined in step 306 and from the associated graphical junction elements stored in the graphical elements storage module 120 (see FIGS. 2A to 2E). The junction graphics data may are representative of the road junction and can be rendered by the display module 114 as an image of the road junction. In this regard, FIG. 4A exemplarily illustrates images that have been generated based on the junction graphics data composed in step 308 for roundabouts with three, four and five involved roads.

Starting with the three-road roundabout on the left-hand side of FIG. 4A, it becomes apparent that the corresponding junction graphics data have been composed from a roundabout graphical element (see FIG. 2D) and from three times the road background element at different rotational angles (see FIG. 2A). In the middle and on the right-hand side of FIG. 4A, two alternative roundabout configurations are illustrated four and five roads, respectively.

As becomes apparent from the various roundabout scenarios of FIG. 4A, the angles between the roads can in the present example not assume arbitrary values. Rather, the angular information as retrieved from the map database 104 for each road is indicated in multiples of a unit angle of 22.5°. Definition of such a unit angle simplifies the composition of the junction graphics data but is only an option (i.e., the road angles could in principle also be exactly specified in the map database 104).

In the present example it is assumed that no lane information could be retrieved from the map database 104. However, as it is known that each ingress lane of a roundabout has to be a right-turn lane in most countries, it is nonetheless possible to add lane-related graphical elements to the junction graphics data. As illustrated on the left-hand side of FIG. 4A, for each road the lane boundary marking element of FIG. 2B as well as the right-turn arrow of FIG. 2E have been added. It should be noted that the roads of the actual roundabout may comprise several ingress lanes, which cannot be represented in the junction graphics data as the corresponding lane information could not be retrieved from the map database 104.

The junction graphics data illustrated in FIG. 4A is typically not rendered or displayed singly by the display module 114, but in combination with manoeuvre indication graphics data indicative of the junction manoeuvre. The manoeuvre indication graphics data are generated in step 310 from the routing information as obtained from the routing module 112 and the junction geometry parameters as determined in step 306. The manoeuvre indication graphics data can be rendered or displayed in a form that is indicative of a junction ingress and a junction egress (and, if lane information is available, of a junction ingress lane and a junction egress lane). In the present example, the manoeuvre indication graphics data can be represented (i.e., visualized) as an arrow (i.e., of a line having an arrow head) as shown in FIG. 4B.

It should be noted that steps 308 and 310 could be performed in any order and also concurrently. Once the junction graphics data and the manoeuvre indication graphics data have been generated in steps 308 and 310, respectively, the corresponding visual information in the form of a navigation manoeuvre graphics as generated by the processor 108 is sent to the display module 114 which renders and displays the navigation manoeuvre graphics (step 312). FIG. 4C illustrates the corresponding navigation manoeuvre graphics for the scenarios of FIG. 4A and the manoeuvre indication graphics data of FIG. 4B. As becomes apparent from FIG. 4C, the navigation manoeuvre graphics is essentially obtained by superimposing the manoeuvre indication (i.e., the arrow) of FIG. 4B on the junction representation of any of FIG. 4A.

Figure 5:
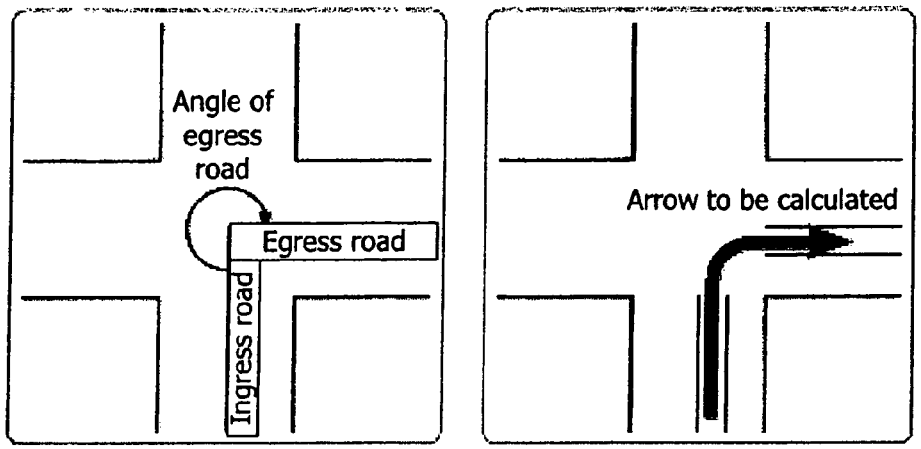
FIGS. 5 and 6 schematically illustrate the generation of manoeuvre indication graphics data in the form of an arrow.
Figure 6:
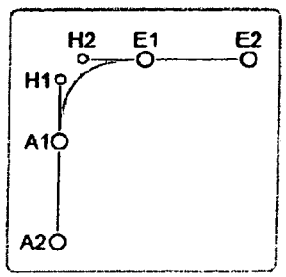

FIGS. 5 and 6 illustrate in more detail the calculation of a manoeuvre indication arrow in step 310 based on the routing information and the junction geometry parameters. In the scenario illustrated in FIGS. 5 and 6, it will be assumed that the junction is of a simple star-type in which the roads form a cross with an angle of 90° between two neighbouring roads. As discussed above, this information can be obtained from the junction geometry parameters as determined in step 306. It will also be assumed that the routing information as received in step 302 indicates that the ingress road is the road coming from below and the egress is the right-hand road (see FIG. 5).

Based on the information illustrated on the left-hand side of FIG. 5, an arrow is automatically generated during runtime as shown in FIG. 6. The arrow comprises three sections, a straight line as start section, a curved line as intermediate section and a straight line as end section. The straight line of the end section receives an arrow head illustrating the turning indication. As shown in FIG. 6, the start section is defined by points A1 and A2, the intermediate section is defined by points A1 and E1 as well as by two control points H1 and H2 that define the course of the curve, and the end section is defined by points E1 and E2. The intermediate section may be generated as a Bézier curve. The locations of the individual points A1, A2, H1, H2, E1 and E2 are determined from the geometrical information included in the junction graphics data as illustrated on the left-hand side of FIG. 5.

Figure 7:
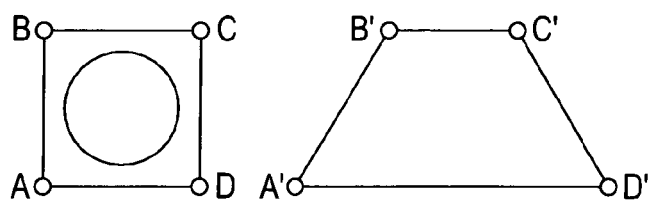
FIGS. 7 and 8 schematically illustrate the distortion of junction graphics data to obtain a three-dimensional impression.

The navigation manoeuvre graphics illustrated in FIGS. 4 to 6 have been generated for a view from the above. Since it is in many times desirable to display the road junction from a driver's perspective, a geometrical distortion of the junction graphics data in accordance with a predefined tilt angle may be performed. To this end, a transformation routine is defined which transforms in the SVG file containing the junction graphics data not the graphics object (constituted by the graphical elements) in its entirety, but the individual points of each graphical element. The basis of this transformation is the mapping of a rectangle on a trapezoid as illustrated in FIG. 7. The points A, B, C, D form the original rectangle (see left-hand side of FIG. 7). These points are mapped on the points A', B', C', D' as illustrated on the right-hand side of FIG. 7, which leads to a perspective impression.

Figure 8:
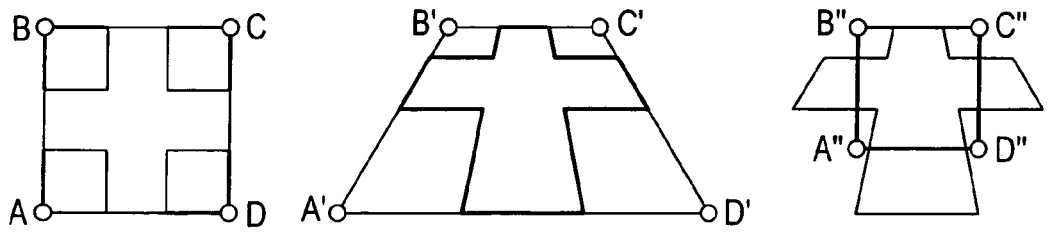

The basic concept illustrated in FIG. 7 can also be applied to more complex graphics objects such as the cross-type junction comprised of various graphical elements as depicted in FIG. 8. Specifically, the cross-type junction as illustrated on the left-hand side of FIG. 8 is in a first step transformed as discussed above with reference to FIG. 7 to obtain the distorted object illustrated in the middle of FIG. 8. Then, in a next step, the rectangle A", B", C", D" is cut-out of the distorted object for the purpose of being rendered by the display module 114.

Figure 9:
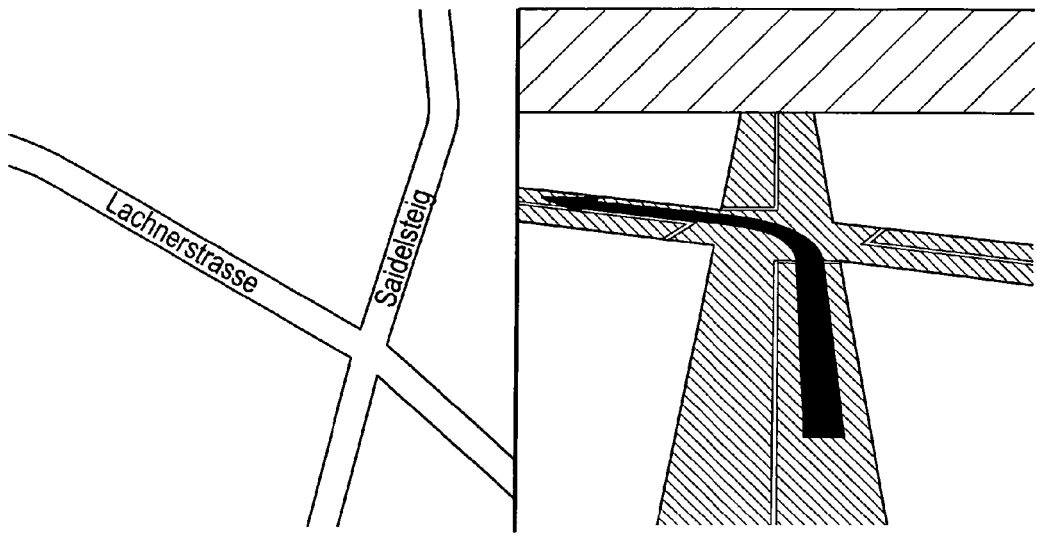
FIGS. 9 and 10 schematically illustrate two further embodiments of generating navigation manoeuvre graphics without taking into account lane information.
Figure 10:
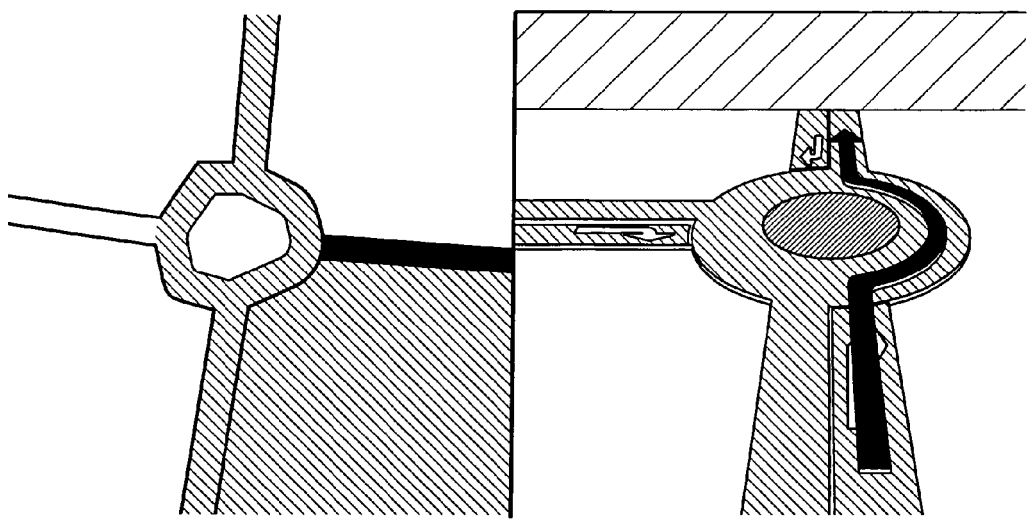

The same distortion as discussed for the junction graphics data with respect to FIG. 8 will be applied to the manoeuvre indication graphics data (e.g., to an arrow as illustrated in FIG. 4B) before a navigation manoeuvre graphics based on the distorted junction graphics data and the distorted manoeuvre indication graphics data will be output by the display module 114. In this regard, FIGS. 9 and 10 illustrate on the respective right-hand side how the navigation manoeuvre graphics that has been generated based on distorted junction graphics data and distorted manoeuvre indication graphics data will look like for two exemplary junctions that have been derived from real road data. A direct rendering of the corresponding road data is in each case shown on the left-hand side.

It should be noted that the examples depicted in FIGS. 9 and 10 have still been derived without relying on any lane information that may optionally be retrieved from the map database 104. If junction information is available, more detailed navigation manoeuvre graphics as illustrated in FIGS. 11 and 12 can be generated.

Figure 11:
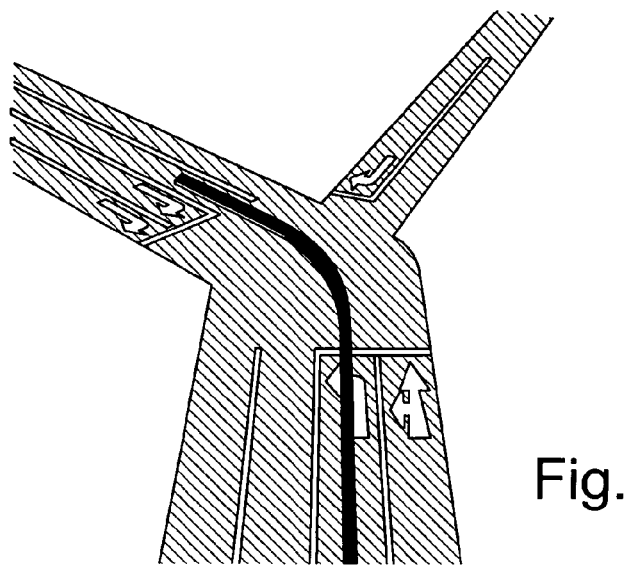
FIGS. 11 and 12 schematically illustrate two embodiments of composing navigation manoeuvre graphics taking into account lane information.
Figure 12:
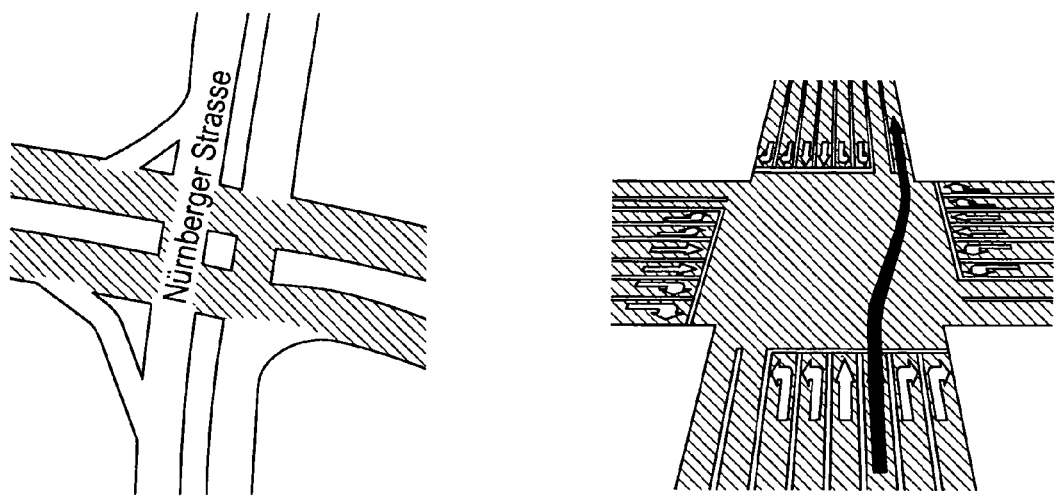

FIG. 11 illustrates the image of a junction involving three roads with multiple lanes as rendered and displayed by the display module 114. As becomes apparent from FIG. 11, the road coming from below includes four lanes, namely a left-turn lane, a left-turn and straight lane as well as two opposite lanes. Based on this information, that may be derived from the road data retrieved from the map database 104, and the associated lane elements of FIGS. 2B, 2C and 2E, junction graphics data as visualized in FIG. 11 can be generated. FIG. 12 illustrates in a similar manner as FIGS. 9 and 10 a direct rendering of the original map data (left-hand side), and the navigation manoeuvre graphics (right-hand side) for multiple-lane roads as generated and displayed by the navigation device 102.

As has become apparent from the above, the technique presented herein allows for a memory-efficient generation of navigation manoeuvre graphics for road junctions. Instead of storing a pre-rendered image for each possible junction type, the junction graphics data are generated from a few graphical junction element that form a kit for repeated re-use. The navigation manoeuvre graphics can be generated in a highly flexible manner taking into account (e.g., at runtime) country-specific and/or user specific settings during runtime of the navigation process.

It is believed that many advantages of the technique presented herein will be fully understood from the forgoing description, and will be apparent that various changes may be made in the form, construction and arrangement of the exemplary aspects thereof without departing from the scope of the invention or without sacrificing all of its advantages. Because the techniques disclosed herein can be varied in many ways, it will be recognized that the invention should be limited only by the scope of the following claims.

The invention claimed is:

1. A method of controlling a navigation device to generate a navigation manoeuvre graphics for a road junction manoeuvre, the method comprising the following steps performed by the navigation device:

providing a plurality of pre-defined graphical junction elements in a vector graphics format, the pre-defined graphical junction elements comprising at least one of junction-type-related graphical elements, road-related graphical elements and lane-related graphical elements in the vector graphics format;

receiving, from a routing module of the navigation device, routing information pertaining to a scheduled route, the scheduled route comprising a road junction;

retrieving, from a map database, road data pertaining to the road junction, wherein the retrieved road data comprises lane information for the road junction;

analysing the road data to determine one or more junction geometry parameters of the road junction, wherein at least one of the determined junction geometry parameters relates to the lane information;

composing, based on the junction geometry parameters and from the plurality of pre-defined graphical junction elements, junction graphics data representative of the road junction and the lane information;

generating, from the routing information and the junction geometry parameters, manoeuvre indication graphics data representative of a lane based junction manoeuvre; and generating a navigation manoeuvre graphics based on the junction graphics data and the manoeuvre indication graphics data.

2. The method of claim 1, wherein the lane information comprises at least one of a number of lanes comprised by a specific road of the junction, a lane type for a lane comprised by a road and an egress lane or road associated with a lane.

3. The method of claim 1, wherein the graphical junction elements comprise at least one of a roundabout element, a road background element one or more lane boundary marking elements, and one or more lane arrow elements indicative of a junction egress lane or road each.

4. The method of claim 1, wherein the junction geometry parameters comprise at least one of a junction type, a number of roads crossing at the junction, an angle at which a road enters the junction, a number of lanes comprised by a road, a lane type for a lane comprised by a road, and an egress lane or road associated with a lane.

5. The method of claim 1, wherein the manoeuvre indication graphics data is indicative of a least one of a junction ingress and a junction egress.

6. The method of claim 5, wherein the manoeuvre indication graphics data is indicative of at least one of a junction ingress lane and a junction egress lane.

7. The method of claim 1, wherein the manoeuvre indication graphics data are indicative of a line or an arrow.

8. The method of claim 1, further comprising:

determining graphics settings, wherein the graphics settings include at least one of country-specific graphics settings and user-specific graphics settings; and processing at least one of the junction graphics data and the manoeuvre indication graphics data taking into account the graphics settings.

9. The method of claim 1, further comprising:

determining image settings, wherein the image settings include at least one of an image size and an image tilt angle; and processing at least one of the junction graphics data and the manoeuvre indication graphics data taking into account the image settings.

10. A non-transitory computer readable medium storing program code portions causing a navigation device to perform the steps of:

providing a plurality of pre-defined graphical junction elements in a vector graphics format, the pre-defined graphical junction elements comprising at least one of junction-type-related graphical elements, road-related graphical elements and lane-related graphical elements in the vector graphics format;

receiving, from a routing module of the navigation device, routing information pertaining to a schedule route, the scheduled route comprising a road junction;

retrieving, from a map database, road data pertaining to the road junction, wherein the retrieved road data comprises lane information for the road function;

analyzing the road data to determine one or more junction geometry parameters of the road function, wherein at least one of the determined junction geometry parameters relates to the lane information;

composing, based on the junction geometry parameters and from the plurality of pre-defined graphical junction elements, junction graphics data representative of the road junction and the lane information;

generating, from the routing information and the junction geometry parameters, manoeuvre indication graphics data representative of a lane based junction manoeuvre; and generating a navigation manoeuvre graphics based on the junction graphics data and the manoeuvre indication graphics data.

11. A navigation device adapted to generate a navigation manoeuvre graphics for a road junction manoeuvre, comprising:

a graphics element storage module adapted to store a plurality of pre-defined graphical elements, wherein the graphical elements are stored in a vector graphics format, the pre-defined graphical junction elements comprising at least one of junction-type-related graphical elements, road-related graphical elements and lane-related graphical elements in the vector graphics format;

a routing module adapted to provide routing information pertaining to a scheduled route, the scheduled route comprising a road junction;

an interface to a map database containing road data pertaining to the road junction, wherein the road data comprises lane information for the road junction; and a processor adapted to analyse the road data to determine one or more junction geometry parameters of the upcoming road junction, wherein at least one of the determined junction geometry parameters relates to the lane information, to compose, based on the junction geometry parameters and from the plurality of pre-defined graphical junction elements, junction graphics data representative of the road junction and the lane information, to generate, from the routing information and the junction geometry parameters, manoeuvre indication graphics data representative of a lane based junction manoeuvre; and to generate a navigation manoeuvre graphics based on the junction graphics data and the manoeuvre indication graphics data.

12. The navigation device of claim 11, further comprising at least one of a display module for outputting the manoeuvre indication graphics data, a navigation sensor module for determining the current location of the navigation device, and the map database.

13. The navigation device of claim 11, further comprising at least one of a graphics settings storage, wherein the graphics settings storage include at least one of country-specific graphics settings and user-specific graphics settings; and wherein the processor is adapted to processing at least one of the junction graphics data and the manoeuvre indication graphics data taking into account the graphics settings; and an image settings storage, wherein the image settings include at least one of an image size and an image tilt angle; and wherein the processor is adapted to processing at least one of the junction graphics data and the manoeuvre indication graphics data taking into account the image settings.

* * * * *